United States Patent [19]
Katsuyama et al.

[11] Patent Number: 4,730,896
[45] Date of Patent: Mar. 15, 1988

[54] MEMBER FOR INFRARED RAY TRANSMISSION

[75] Inventors: Toshio Katsuyama, Hachioji; Hiroyoshi Matsumura, Saitama, both of Japan

[73] Assignees: Hitachi, Ltd.; Hitachi Cable Ltd., both of Japan

[21] Appl. No.: 799,974

[22] Filed: Nov. 20, 1985

[30] Foreign Application Priority Data
Nov. 21, 1984 [JP] Japan .............................. 59-244501

[51] Int. Cl.$^4$ ...................... G02B 6/00; C03C 13/04; F21V 9/04
[52] U.S. Cl. .............................. 350/96.34; 350/1.1; 350/96.30; 501/37; 501/42; 501/904; 252/587
[58] Field of Search ............... 350/96.30, 96.34, 1.1; 430/616; 65/3.11; 423/508, 509, 510; 501/37, 42, 94, 95, 901, 904; 252/584, 587

[56] References Cited
U.S. PATENT DOCUMENTS

| | | | |
|---|---|---|---|
| 4,154,503 | 5/1979 | Lettington et al. | 350/96.34 |
| 4,188,089 | 2/1980 | Gliemeroth et al. | 350/96.34 |
| 4,612,294 | 9/1986 | Katsuyama et al. | 501/904 |

FOREIGN PATENT DOCUMENTS
61-127639 6/1986 Japan .................................. 501/904

Primary Examiner—William L. Sikes
Assistant Examiner—Brian M. Healy
Attorney, Agent, or Firm—Antonelli, Terry & Wands

[57] ABSTRACT

A member capable of transmitting infrared rays of 2 μm or longer in wavelength, particularly of 10.6 μm in wavelength, with a slight loss is provided. The member comprises a Ge-Se-Te ternary chalcogenide glass having a composition which, in a compositional diagram of the ternary chalcogenide glass falls within the region bounded by the respective straight lines connecting points A, B, C, D, and E and A in this order, which points A, B, C, D, and E indicate Ge:Se:Te molar proportions of 32:25:43, 20:6:74, 15:5:80, 15:10:75, and 22:31:47, respectively.

4 Claims, 3 Drawing Figures

MEMBER FOR INFRARED RAY TRANSMISSION

BACKGROUND OF THE INVENTION

The present invention relates to a member or guide for infrared ray transmission, such as optical fibers, which well transmit infrared rays of 2 μm or longer in wavelength, and particularly to a member for infrared ray transmission capable of transmitting infrared rays of 10.6 μm in wavelength with a small loss.

In recent years, optical fibers capable of transmitting of about 10.6 μm in wavelength have been demanded for a $CO_2$-laser beam guide or infrared ray guide for a radiation thermometer. Various materials have been investigated for meeting the demand, the fibers of TlBr-TlI were found to transmit a ray of 10.6 μm in wavelength with a slight loss of 0.4 dB/m (Sakuragi et al., O plus E, published by Seiki Tsushinsha, October, 1980, pp. 49–53). However, it has been revealed that these fibers, because of the polycrystalline structure thereof, has the drawbacks of being brittle and exhibiting an increased light scattering loss due to the plastic deformation thereof caused by bending.

Se- or S-containing chalcogenide glass fibers are free of the same drawbacks as those of the fibers of TlBr-TlI, but is deficient in practicality since the transmission loss of a ray of 10.6 μm in wavelength is as great as 4.5 dB/m (S. Takahashi et al., Technical Digest of 100 C, 1983, Tokyo 30A 2-4).

SUMMARY OF THE INVENTION

It is an object of the present invention to provide a waveguide member comprising a chalcogenide glass for transmitting infrared rays of 2 μm or longer in wavelength, particularly of 10.6 μm in wavelength, without any substantial transmission loss.

DETAILED DESCRIPTION OF THE INVENTION

Figure 1:
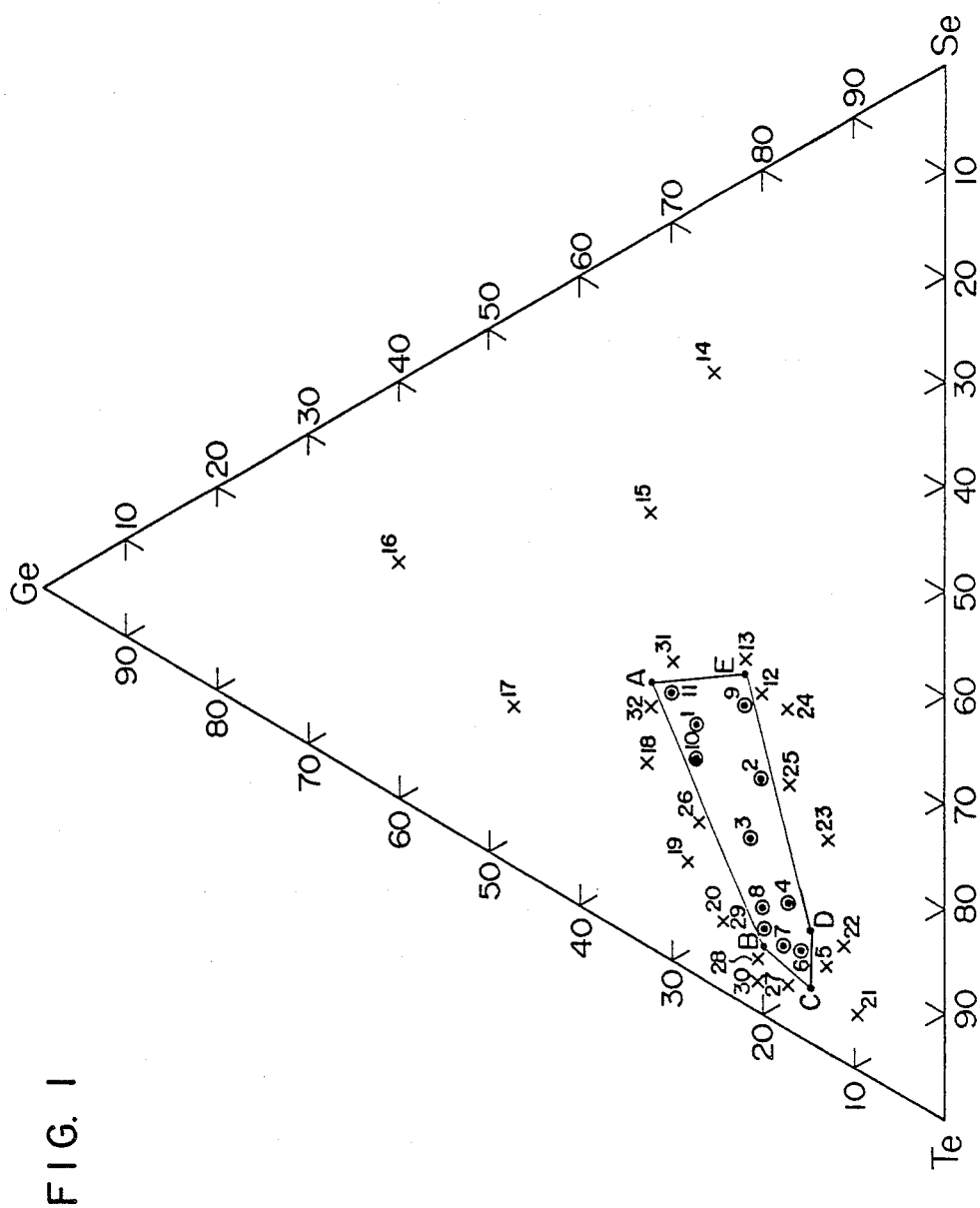
FIG. 1 is a compositional diagram of a Ge-Se-Te ternary chalcogenide glass and shows results of Example 2 described herein.

The transmission loss of infrared rays through a waveguide made of a chalcogenide glass depends principally on lattice vibrations of the glass. In order to reduce the transmission loss, it is necessary to shift the absorption band ascribed to a lattice vibration to the side of longer wavelengths. A possible way of achieving this purpose is to increase the mass of the constituent atom. The frequency $v$ of a lattice vibration is given by $$v = \frac{1}{2\pi}\sqrt{\frac{K}{m}} \quad (1)$$

wherein m is the mass of a constituent atom and K is the interatomic force constant. Accordingly, the wavelength $v$ of the lattice vibration is expressed by $$\lambda = \frac{C}{v} = 2\pi C\sqrt{\frac{m}{K}} \quad (2)$$

wherein C is the velocity of ray. It can be seen from this expression that the wavelength of a lattice vibration increases with an increase in the mass of the atom. Based on the above consideration. The present inventors have noticed the use of Te having a large mass (atomic weight 127.6), as an atom constituting a chalcogenide glass, and investigated the stability of a Te-containing chalcogenide glass. As a result, the Ge-Se-Te ternary chalcogenide glass having a composition in a certain range has been found to be fitted for the intended infrared ray guides, and used as members for infrared ray transmission. The suitable composition range is shown in FIG. 1, wherein points A, B, C, D, and E indicate Ge:Se:Te molar proportions of 32:25:43, 20:6:74, 15:5:80, 15:14:21, and 22:31:47, respectively.

According to the present invention, infrared ray optical fibers can be put into practical use which are capable of transmitting high-power $CO_2$ laser beams with the limited transmission loss and over many hours and moreover do not undergo variation (increase) in the transmission loss even when bended repeatedly. Thus the present invention is effective in promoting the development of simplified and economical optical-energy equipment.

The following examples will illustrate the invention in more detail.

EXAMPLE 1

A Ge ingot of 99.99999999% purity was crushed down into particles of 2 mm in diameter. An Se shot of 99.999% purity and a Te shot of 99.9999% purity were rectified at 800° C. These materials were sealed under vacuum in a silica ampoule (inner diameter 10 mm, outer diameter 16 mm, length 200 mm) so as to give an internal pressure of $5 \times 10^{-6}$ Torr. Prior to the sealing, 0.2 mg of Al was added for the purpose of reducing the ray transmission loss due to the ray absorption caused by the oxygen impurity which would be contained in the product chalcogenide glass. The silica ampoule was then set in a rocking furnace, and the content was fused with stirring at 800° C. for 35 hours. Thereafter, the ampoule was dipped in liquid nitrogen to quench the content, thus giving 10 g of a chalcogenide glass block of Ge:Se:Te=22:20:58 (molar ratio).

To evaluate this chalcogenide glass, an optical fiber was formed by pulling a heated sample of the glass through a silica nozzle at a pressure of 0.4 kg/cm², where the nozzle diameter was 1.1 mm and the heating temperature was 330° C.

The transmission loss of light at a wavelength of 10.6 μm through this optical fiber was found to be as small as 0.8 dB/m. A light beam (wavelength 10.6 μm) emitted from a 100-W $CO_2$ gas laser could be transmitted continuously for about 30 minutes by this optical fiber. Infrared light guides in rod form and flat plate form were also prepared from the above chalcogenide glass block.

EXAMPLE 2

Similar chalcogenide glass optical fibers but different in composition from the fiber of Example 1 were prepared and evaluated in the same manner as in Example 1. The following table shows the compositions of the prepared optical fibers and the transmission losses of light at a wavelength of 10.6 μm through these optical fibers.

Any of these optical fibers could transmit a 50-W or higher-power $CO_2$ laser beam and the transmission loss through these fibers did not vary even when they were bent repeatedly.

TABLE

| Sample No. | Content (mol %) | | | Transmission loss (dB/m) |
|---|---|---|---|---|
| | Ge | Se | Te | |
| 1 | 27 | 24 | 49 | 0.9 |
| 2 | 20 | 22 | 49 | 0.8 |
| 3 | 21 | 16 | 63 | 0.4 |
| 4 | 17 | 12 | 71 | 0.2 |
| 5 | 13 | 8 | 79 | 5.0 or more |
| 6 | 16 | 8 | 76 | 0.2 |
| 7 | 18 | 7 | 75 | 0.2 |
| 8 | 20 | 10 | 70 | 0.2 |
| 9 | 22 | 28 | 50 | 0.8 |
| 10 | 27.5 | 20 | 52.5 | 0.8 |
| 11 | 30 | 25 | 45 | |
| 12 | 20 | 30 | 50 | 1.5 |
| 13 | 22 | 32 | 46 | 3.0 or more |
| 14 | 25 | 58 | 17 | 5.0 or more |
| 15 | 32 | 41 | 27 | 5.0 or more |
| 16 | 60 | 22 | 18 | 5.0 or more |
| 17 | 47 | 15 | 38 | 5.0 or more |
| 18 | 33 | 17 | 50 | 5.0 or more |
| 19 | 28 | 10 | 62 | 5.0 or more |
| 20 | 24 | 7 | 69 | 5.0 or more |
| 21 | 10 | 5 | 85 | 2.0 or more |
| 22 | 11 | 11 | 78 | 2.0 or more |
| 23 | 13 | 20 | 67 | 2.0 or more |
| 24 | 17 | 30 | 53 | 2.0 or more |
| 25 | 17 | 23 | 60 | 1.0 |
| 26 | 27 | 15 | 58 | 5.0 or more |
| 27 | 17 | 4 | 79 | 2.0 |
| 28 | 20 | 5 | 75 | 1.5 |
| 29 | 20 | 8 | 72 | 0.2 |
| 30 | 20.5 | 2.5 | 77 | 2.0 |
| 31 | 30 | 28 | 42 | 5.0 |
| 32 | 32 | 23 | 45 | 5.0 |

In FIG. 1, marks x and o denote the respective compositions of the optical fibers through which the transmission losses of light at a wavelength of 10.6 μm were larger and not larger than 1 dB/m. It can be said from the above results that the Ge-Se-Te ternary chalcogenide glasses having compositions which, in FIG. 1, lie in the region bounded by the straight lines connecting A to B, B to C, C to D, D to E, and E to A, respectively, are fitted to optical fibers for transmitting infrared rays.

Figure 2:
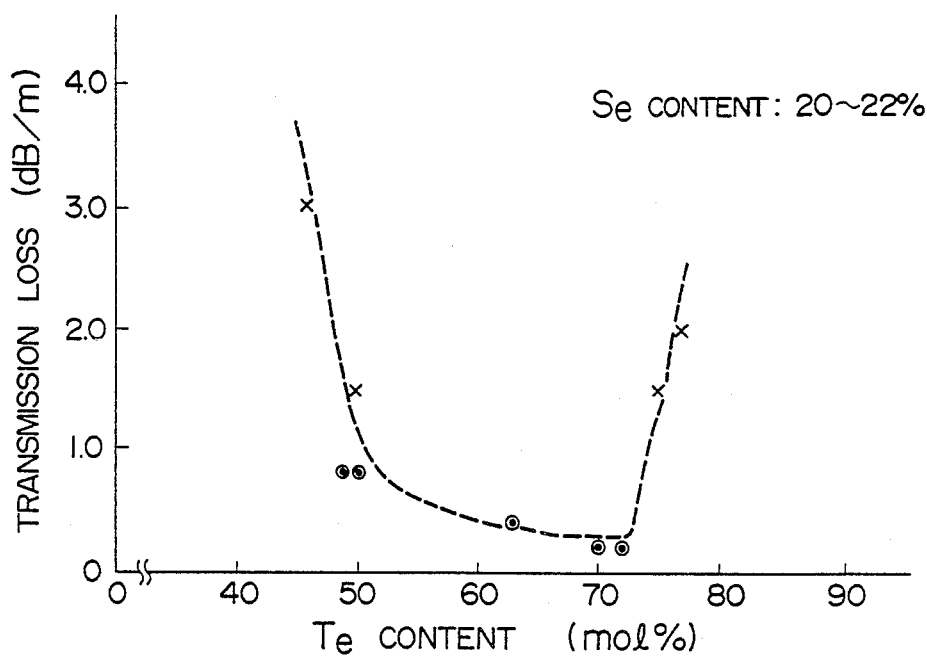
FIG. 2 is a graph showing the dependence of the transmission loss on the Te content in a series of optical fibers made from the above-mentioned glass which contains the Se content ranging from 20 to 22 mol %.
Figure 3:
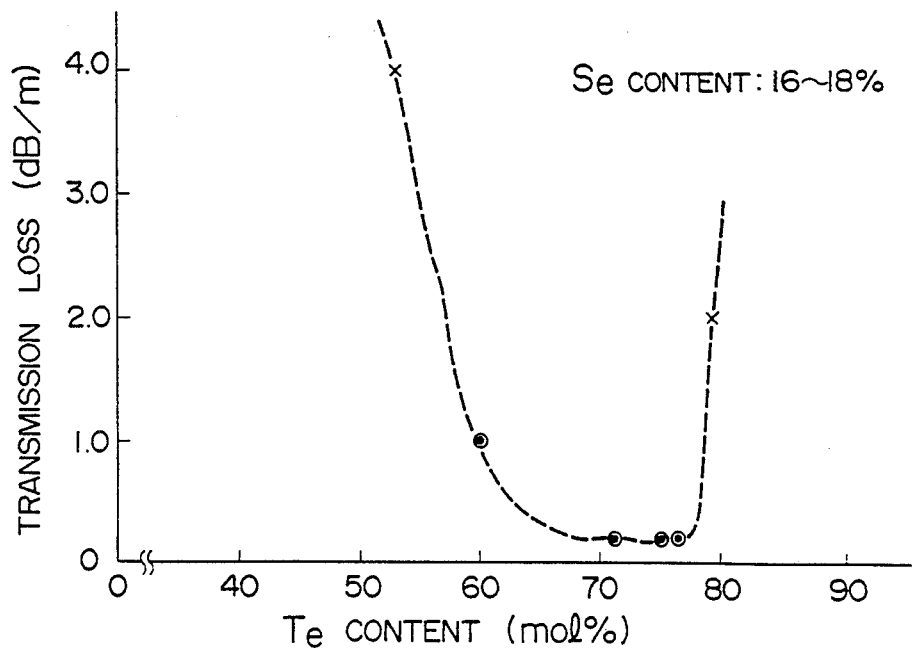
FIG. 3 is a graph showing the same dependence as in FIG. 2, except that the Se content ranges from 16 to 18 mol %.

While the transmission loss appears from the table to depend greatly on the Te content, the effect of the Te content on the transmission loss is in turn dependent on the Se content. To exemplify this, FIG. 2 shows the dependence of the transmission loss on the Te content when the Se content is from 20 to 22 mol % and FIG. 3 shows the same dependence when the Se content is from 16 to 18 mol %. In FIGS. 2 and 3, marks o and x have the same meaning as in FIG. 1. It can be seen from FIGS. 2 and 3 that unexpectably marked difference in the transmission loss is present between the samples of mark o and mark x depending on their compositions.

What is claimed is:

1. A member for transmitting infrared rays, which comprises a Ge-Se-Te ternary chalcogenide glass having a composition which in a compositional diagram of the ternary chalcogenide glass shown in FIG. 1 falls within a region bounded by the respective straight lines connecting points A, B, C, D, E and A in this order, which points A, B, C, D, and E indicate Ge:Se:Te molar proportions of 32:25:43, 20:6:74, 15:5:80, 15:10:75, and 22:31:47, respectively.

2. The member of claim 1, which is an optical fiber for transmittng infrared rays.

3. The member of claim 2, which is in the form of rod or flat plate.

4. The member of claim 1, which further contains aluminum.

* * * * *